(12) United States Patent
Mahalingam et al.

(10) Patent No.: US 9,775,286 B2
(45) Date of Patent: Oct. 3, 2017

(54) CUTTING DISK AND SYSTEM FOR VERTICALLY MOWING TURF

(71) Applicant: Textron, Inc., Providence, RI (US)

(72) Inventors: Ramya Mahalingam, Charlotte, NC (US); Robert James Pilon, Jr., Huntersville, NC (US); James Christopher Fox, Charlotte, NC (US)

(73) Assignee: Textron Innovations Inc., Providence, RI (US)

( * ) Notice: Subject to any disclaimer, the term of this patent is extended or adjusted under 35 U.S.C. 154(b) by 158 days.

(21) Appl. No.: 14/525,410

(22) Filed: Oct. 28, 2014

(65) Prior Publication Data

US 2016/0113197 A1    Apr. 28, 2016

(51) Int. Cl.
*A01D 34/52*     (2006.01)
*A01D 34/44*     (2006.01)
*A01D 101/00*   (2006.01)
*A01B 33/10*     (2006.01)

(52) U.S. Cl.
CPC ............. *A01D 34/52* (2013.01); *A01D 34/44* (2013.01); *A01B 33/103* (2013.01); *A01D 2101/00* (2013.01)

(58) Field of Classification Search
CPC .................................................. A01B 33/103
USPC ......................................... 172/119, 555, 556
See application file for complete search history.

(56) References Cited

U.S. PATENT DOCUMENTS

| 615,005 | A | * | 11/1898 | Walquist | ............ | B26D 1/0006 |
|---|---|---|---|---|---|---|
| | | | | | | 83/676 |
| 835,371 | A | * | 11/1906 | Smith | .................... | A01B 21/04 |
| | | | | | | 172/182 |
| 907,509 | A | * | 12/1908 | Kramer | ................ | A01B 33/103 |
| | | | | | | 172/556 |
| 1,076,745 | A | * | 10/1913 | Ciccolini | ............... | A01B 41/04 |
| | | | | | | 172/108 |
| 1,141,765 | A | * | 6/1915 | Bullard | ................ | A01B 33/103 |
| | | | | | | 114/77 A |
| 1,509,389 | A | * | 9/1924 | Bernard | ................. | A01D 33/06 |
| | | | | | | 56/504 |
| 1,699,151 | A | * | 1/1929 | Miller et al. | ......... | A01B 33/103 |
| | | | | | | 172/540 |
| 1,702,707 | A | | 2/1929 | Sleffel | | |
| 1,896,391 | A | * | 2/1933 | Chong et al. | .......... | A01D 34/52 |
| | | | | | | 172/556 |
| 2,300,446 | A | * | 11/1942 | Fidler | .................... | A01B 15/18 |
| | | | | | | 172/555 |

(Continued)

*Primary Examiner* — Thomas B Will
*Assistant Examiner* — Joel F. Mitchell
(74) *Attorney, Agent, or Firm* — Polster Lieder

(57) ABSTRACT

A disk for vertically cutting grass surfaces, the disk includes a center plate mountable to a shaft and a plurality of teeth extending from a circumferential edge of the center plate. Each tooth comprises a base extending from the circumferential edge of the center plate and at least one blade extending from the base at an offset angle. Each blade includes a neck extending from the base at the offset angle, and a tip extending radially outward from the neck relative to a center plane of the center plate such that the tip is offset from the center plane. The tip also extends from the neck at a yaw angle relative to the center plane such that when the disk is rotated about a rotational axis of the shaft a leading edge of the tip rotates in a different rotational plane than a trailing edge of the tip.

19 Claims, 12 Drawing Sheets

(56) References Cited

U.S. PATENT DOCUMENTS

| | | | | |
|---|---|---|---|---|
| 2,575,321 | A | * | 11/1951 | Traver .................... A01B 23/00 172/555 |
| 2,596,527 | A | * | 5/1952 | Bushong .............. A01B 33/103 172/555 |
| 2,599,843 | A | * | 6/1952 | Knutzen ................ A01B 41/04 172/108 |
| 2,663,241 | A | * | 12/1953 | Howard ............... A01B 33/103 172/556 |
| 2,827,751 | A | | 3/1958 | Macaro |
| 3,102,376 | A | * | 9/1963 | Henderson ............. A01D 34/52 172/15 |
| 3,233,686 | A | * | 2/1966 | Steadman ............ A01B 33/021 172/119 |
| 4,421,178 | A | * | 12/1983 | Vandelli ............... A01B 33/103 172/253 |
| 4,838,359 | A | * | 6/1989 | Kirch ....................... A01B 9/00 172/123 |
| 6,393,814 | B1 | | 5/2002 | Gorey |
| 7,198,114 | B2 | | 4/2007 | Simon et al. |
| 7,677,324 | B2 | | 3/2010 | Jones et al. |

* cited by examiner

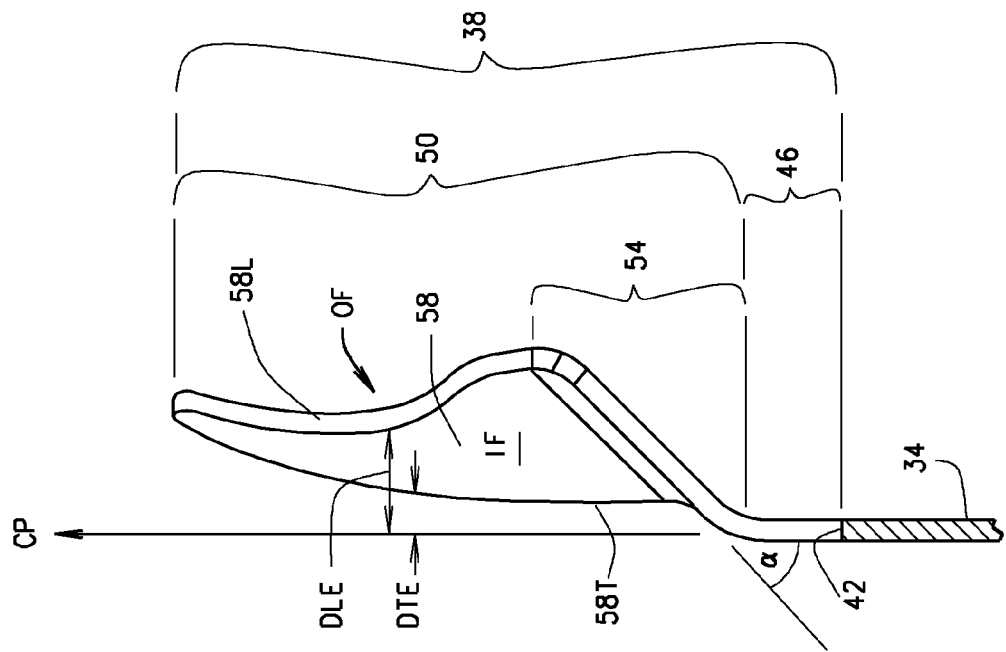
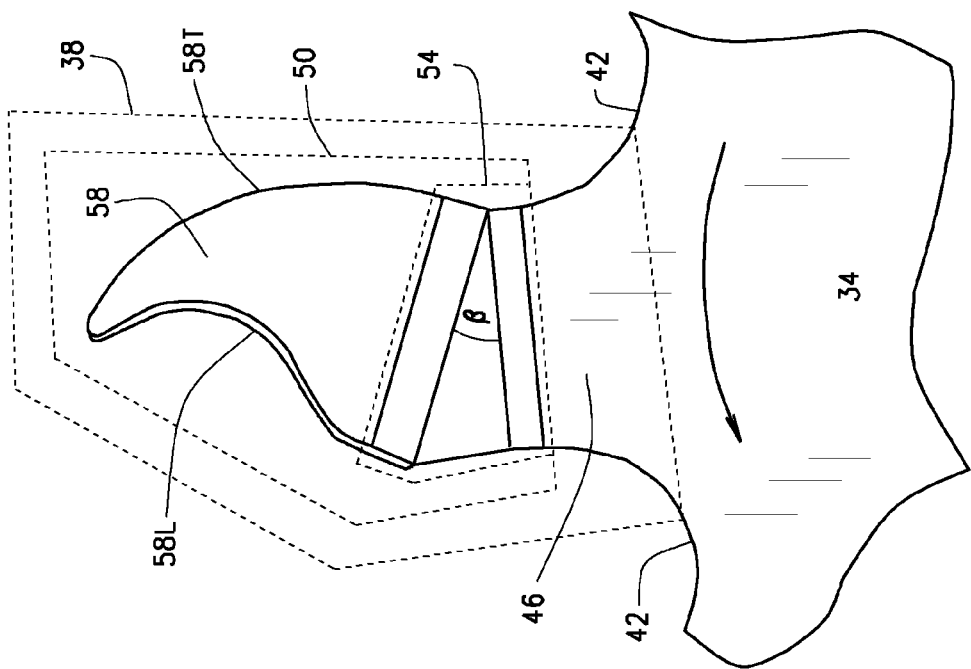

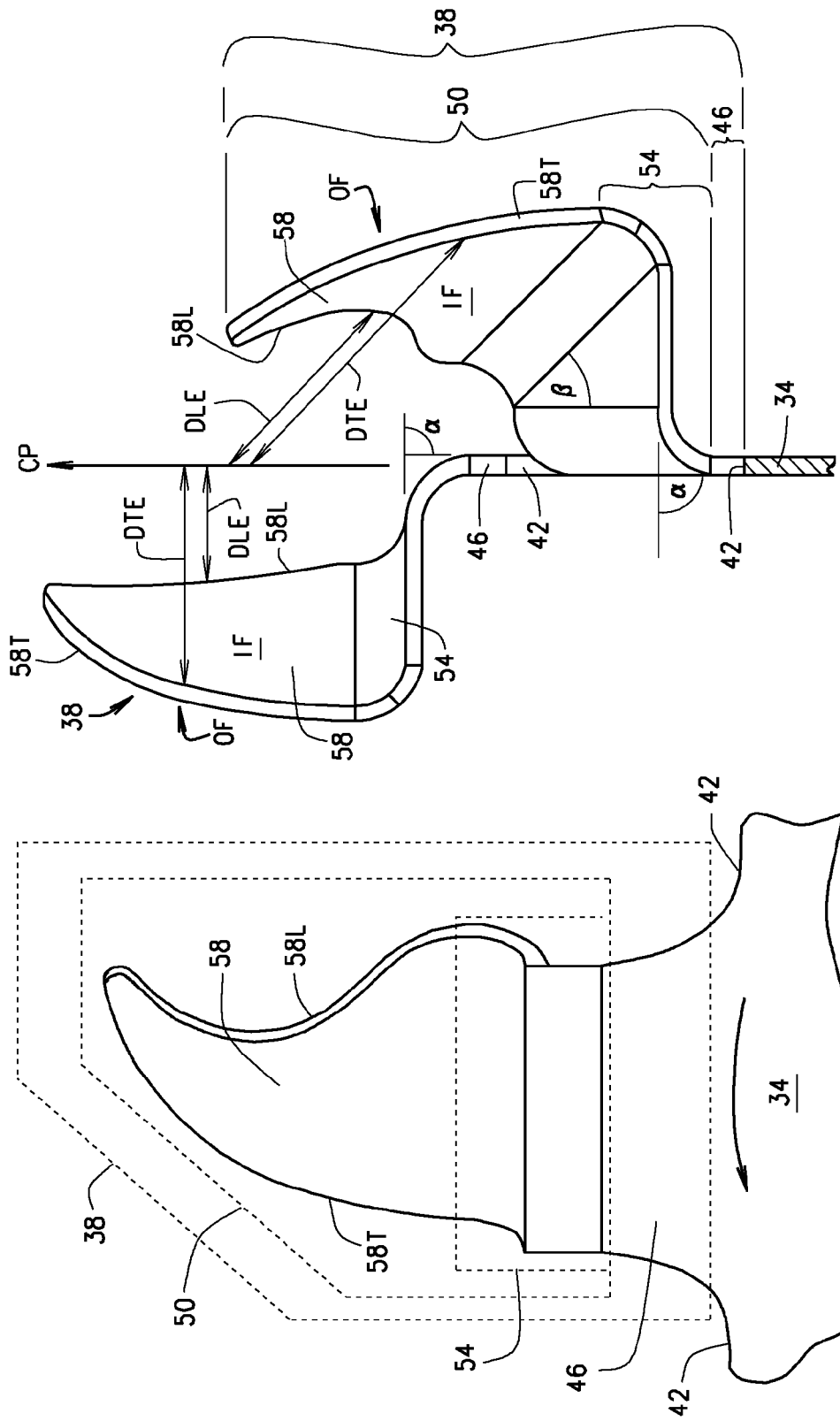

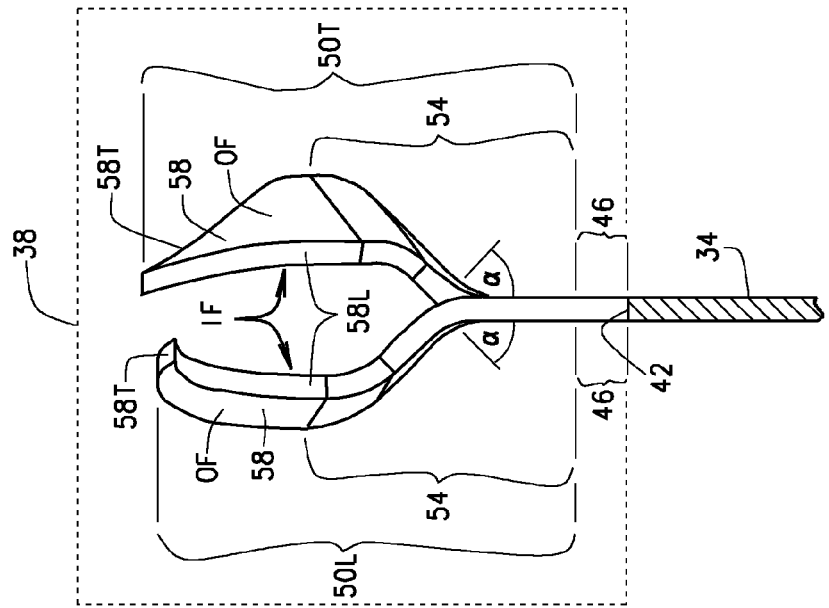
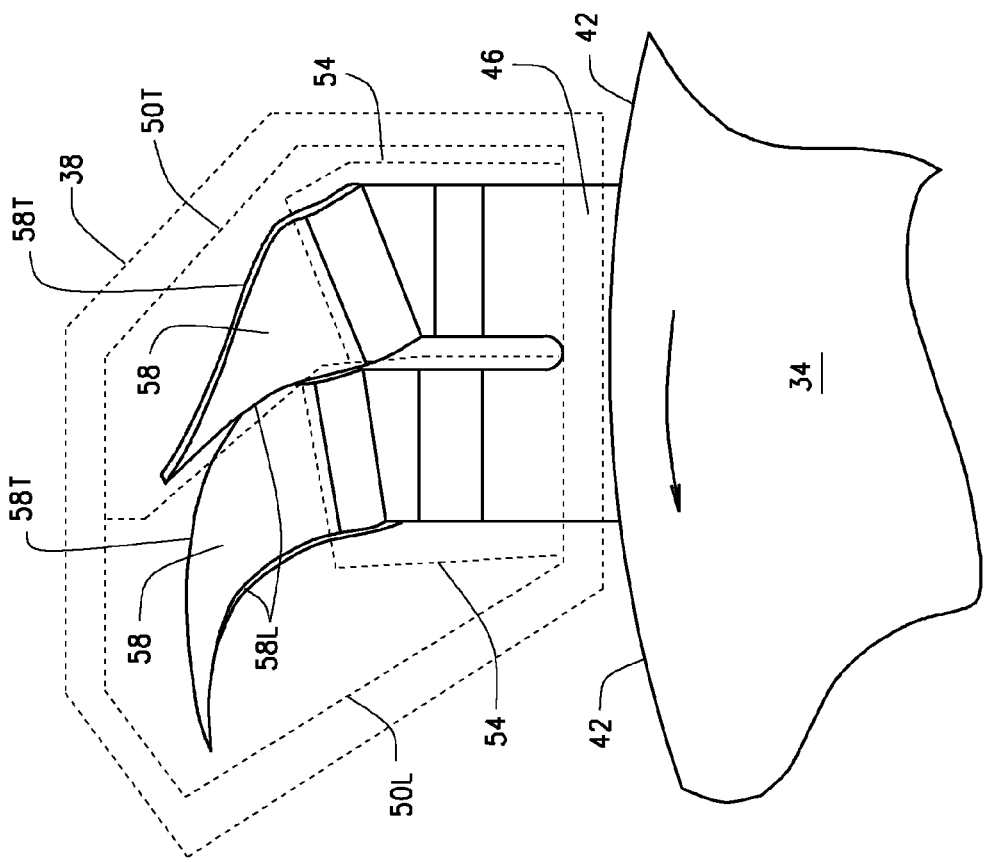
FIG. 8A
FIG. 8B

CUTTING DISK AND SYSTEM FOR VERTICALLY MOWING TURF

FIELD

The present disclosure relates to devices and systems for vertically cutting grass surfaces, such as golf course greens. More particularly, the present disclosure related to vertical cutting disks and vertical cutting disk cylinders for vertically cutting such grass surfaces.

BACKGROUND

The statements in this section merely provide background information related to the present disclosure and may not constitute prior art.

Vertical mowing, often termed 'Verticutting', is a non-mowing practice carried out periodically on greens and fairways of golf courses to remove thatch, remove stolon and rhizome (i.e., horizontal roots connecting blades of grass) promote an upright growth habit of the grass, and open grooves in the turf canopy to prepare for topdressing. Verticutting can also be performed to remove excessive leaf growth, improve mowing quality and surface conditions, and eliminate poa annua seed heads.

Typically, turf-care vehicles used for verticutting are generally the same reel-type turf-care vehicles used for routine cutting and grooming of greens and fairways. Such vehicles typically include one or more reel head assemblies that each comprises a cylindrical cutting reel having a plurality of grass cutting blades helically disposed about a shaft that is rotationally mounted within a metal frame. As is known in the art, such cylindrical cutting reels are utilized to cut, groom and manicure grass surfaces such as greens and fairways of golf courses. Generally, to perform verticutting, the cutting reel of each head assembly is removed and replaced with a verticutting cylinder that comprises a plurality of verticut disks mounted along an axle that can be rotationally mounted within the respective head assembly frame. Known verticut disks are flat and comprise a flat center plate and a plurality of flat fingers that extend from a circumferential edge of the center plate and lay entirely within the plane of the center plate. After the verticutting cylinder(s) is/are rotational mounted within the head unit frame(s), the cylinder(s) (i.e., the plurality of verticut disks) is/are placed in contact with the surface to be verticut and rotated, whereby the fingers cut vertically into the turf with the intent of cutting into the thatch layer and separating the horizontal grass runners (i.e., stolon and rhizome).

However, such known verticut disks and cylinders are not effective at pulling out thatch, promoting a vertical growth habit, or fulfilling the other functions of verticutting. Moreover, they are often not effective in proficiently separating the horizontal grass runners in just one pass such that operators often must verticut the same surface multiple times to achieve the desired effect, changing the cutting path direction each time. Additionally, sometimes operators need to verticut in a circular path to cut the horizontal grass runners in a direction different from the direction in which grass runners naturally tend to grow. Therefore, verticutting using known verticut disks and cylinders is time intensive takes longer and can cause the operator fatigue.

SUMMARY

The present disclosure provides a vertical cutting disk for vertically cutting grass surfaces. In various embodiments, the disk includes a center plate mountable to a shaft and the center plate defines a center plane of the disk. The disk additionally includes a plurality of teeth extending from a circumferential edge of the center plate. Each tooth comprises a base that extends from the circumferential edge of the center plate and at least one blade extending from the base at an offset angle. Each blade includes a neck extending from the base at the offset angle, and a tip extending radially outward from the neck relative to the center plane such that the tip is offset from the center plane. The tip also extends from the neck at a yaw angle relative to the center plane such that when the disk is rotated about a rotational axis of the shaft a leading edge of the tip will rotate in a different rotational plane than a trailing edge of the tip.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 5A is a side view of an exemplary tooth of a plurality of teeth of a vertical cutting disk such as that shown in FIG. 4, in accordance with various embodiments of the present disclosure.

FIG. 5B is an edge view of the tooth shown in FIG. 5A, in accordance with various embodiments of the present disclosure.

FIG. 6A is a side view of an exemplary tooth of a plurality of teeth of a vertical cutting disk such as that shown in FIG. 4, in accordance with various other embodiments of the present disclosure.

FIG. 6B is an edge view of two teeth shown in FIG. 6A, in accordance with various embodiments of the present disclosure.

FIG. 8A is a side view of an exemplary double-bladed tooth of a plurality of teeth of the vertical cutting disk such shown in FIG. 7, in accordance with various embodiments of the present disclosure.

FIG. 8B is an edge view of the double-bladed tooth shown in FIG. 8A, in accordance with various embodiments of the present disclosure.

Corresponding reference numerals indicate corresponding parts throughout the several views of drawings.

DETAILED DESCRIPTION

Figure 1:
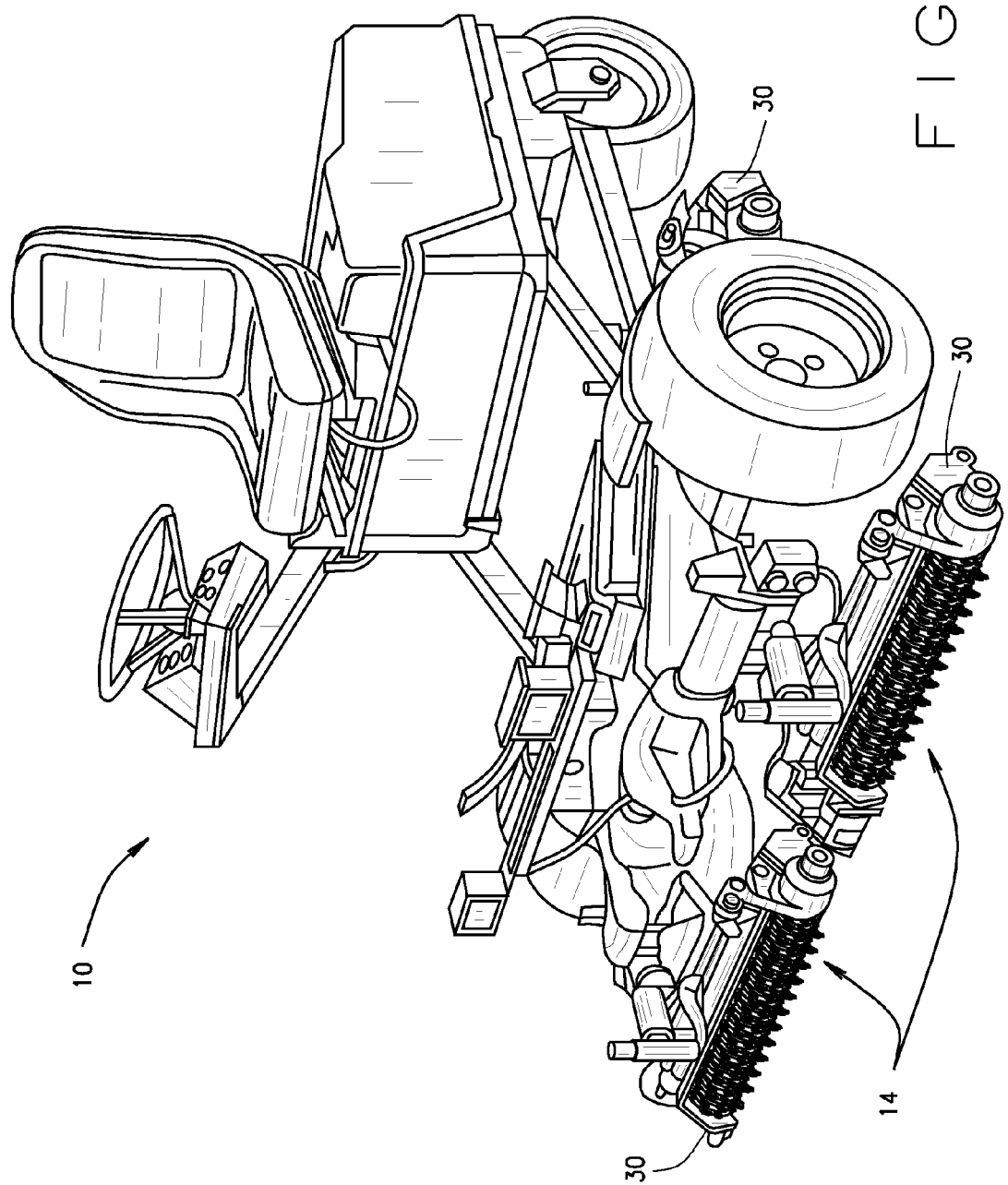
FIG. 1 is an isometric view of a turf-care vehicle including one or more vertical cutting cylinders, in accordance with various embodiments of the present disclosure.

The following description is merely exemplary in nature and is in no way intended to limit the present teachings, application, or uses. Throughout this specification, like reference numerals will be used to refer to like elements.

Figure 2:
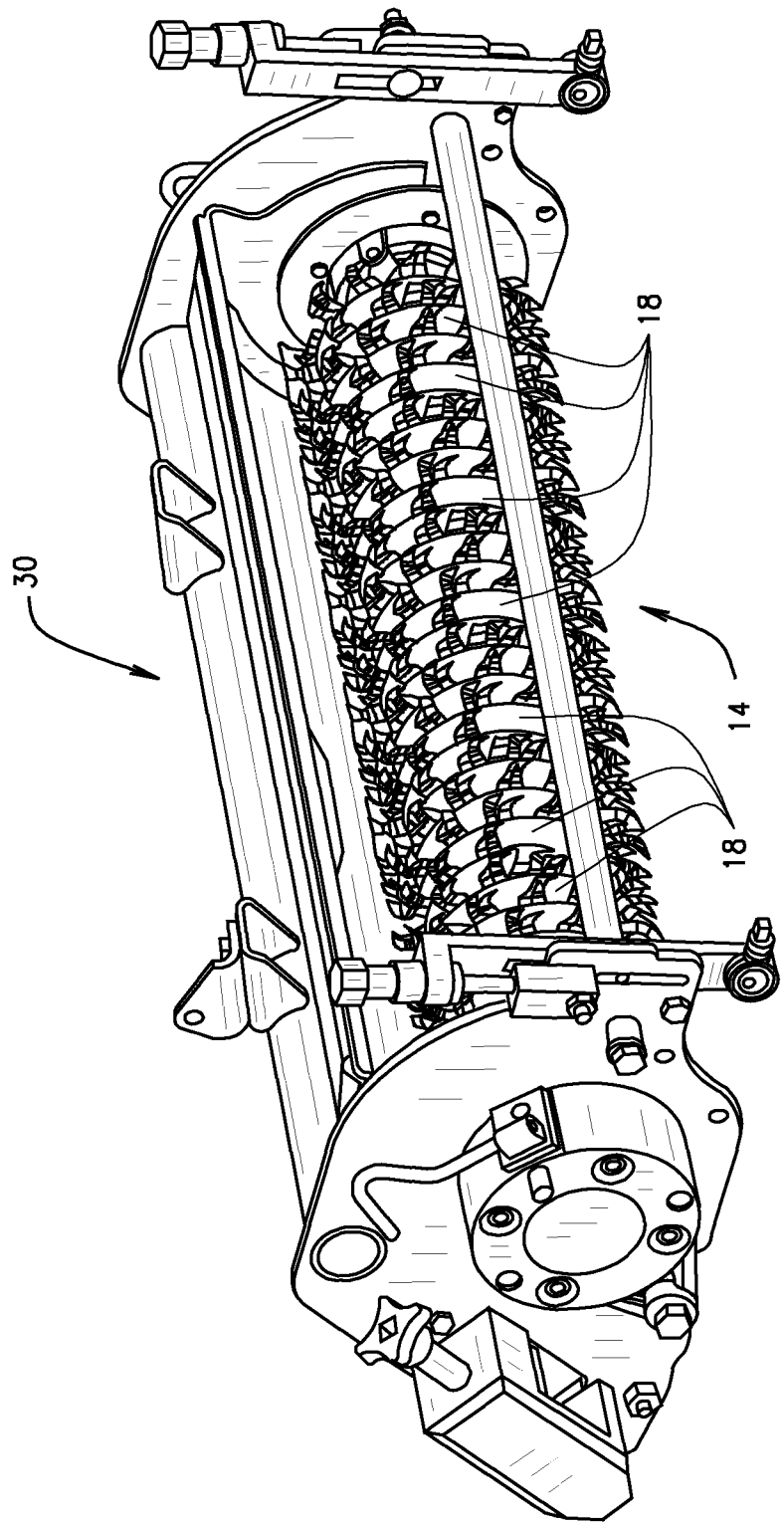
FIG. 2 is an isometric view of a reel head assembly of the turf-care vehicle shown in FIG. 1 having a vertical cutting cylinder rotationally mounted therein, in accordance with various embodiments of the present disclosure.
Figure 3:
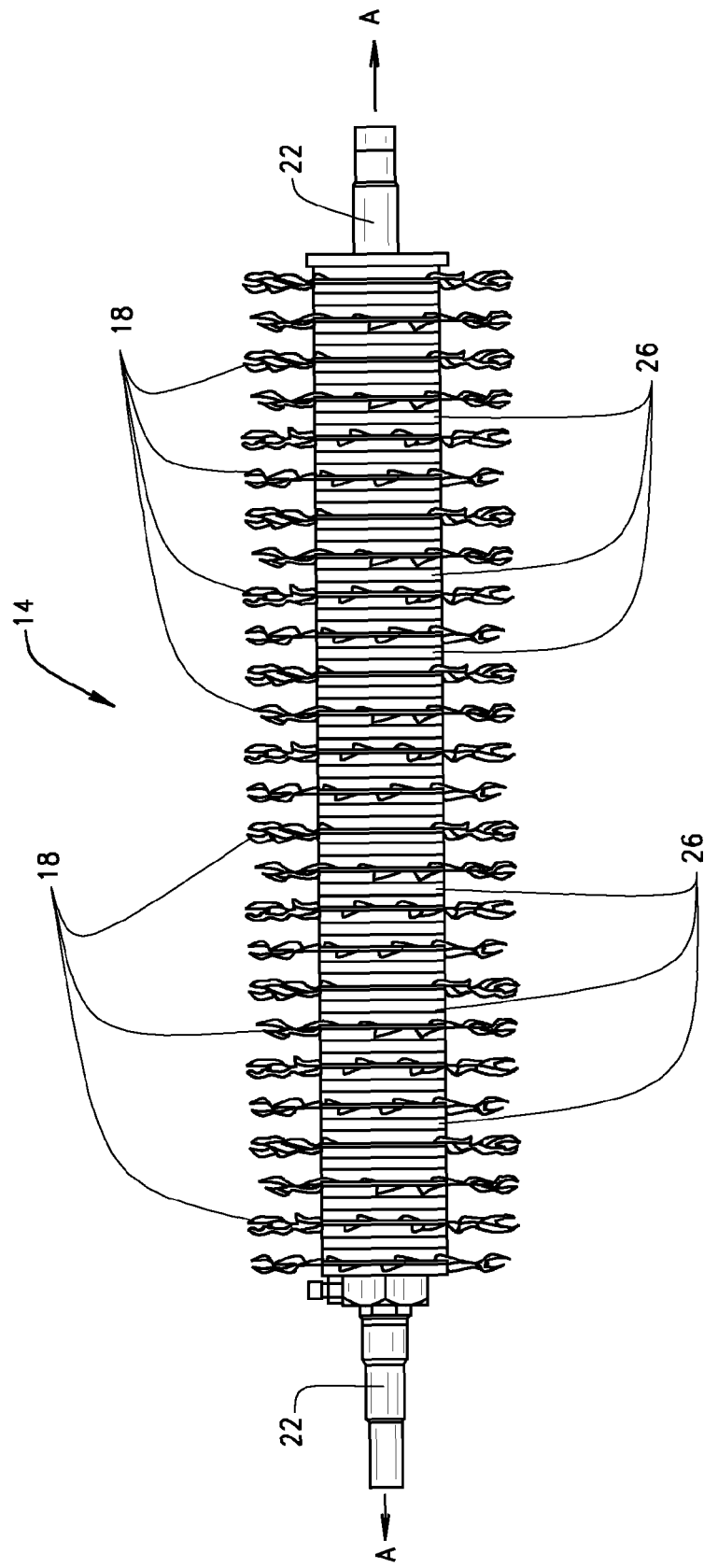
FIG. 3 is a front view of an exemplary vertical cutting cylinder shown in FIGS. 1 and 2, in accordance with various embodiments of the present disclosure.

Referring to FIGS. 1, 2 and 3, the present disclosure provides exemplary embodiments of a turf-care vehicle 10 including one or more vertical cutting cylinders 14 (referred to herein as verticut cylinders 14) comprising a plurality of the vertical cutting disks 18 (referred to herein as verticut disks 18), wherein the verticut cylinder(s) 14 is/are mountable to the turf-care vehicle 10 for vertically cutting grass surfaces such as those found on golf course greens and fairways. Although the turf-care vehicle 10 is exemplarily illustrated in FIG. 1 as a riding turf-care vehicle having a plurality of verticut cylinders 14 rotationally mounted thereto, the present disclosure should not be so limited. It is envisioned that the turf-care vehicle 10 can comprise any turf-care vehicle suitable for having one or more verticut cylinders rotationally mounted thereto, and structured and operable to control operation of the verticut cylinder(s) 14 (i.e., rotation of the verticut cylinder(s) 14). For example, it is envisioned that the turf-care vehicle 10 can be a walk-behind turf-care vehicle, or other styles and types of riding turf-care vehicles and remain within the scope of the present disclosure.

Each verticut cylinder 14 comprises a plurality of verticut disks 18 mounted on a shaft 22 and spaced apart by one or more spacers 26. Each verticut cylinder 14, more particularly, each verticut disk 18 of the respective verticut cylinder 14, is structured and operable to remove stolon and rhizome (i.e., horizontal roots connecting blades of grass), remove thatch, promote an upright growth habit of the grass, and open grooves in the turf canopy to prepare for topdressing, as described in detail below. Generally, each verticut cylinder 14 is rotationally mountable, via the respective shaft 22, within a respective one of one or more reel head assemblies 30 of the turf-care vehicle 10. Each reel head assembly 30 is structured and operable such that a respective cylindrical grass cutting reel (not shown) rotationally mounted therein during normal grass cutting/grooming routines can be removed and replaced with a respective verticut cylinder 14 when verticutting is desired. Moreover, the same motors, engines, drive systems, actuators, controllers, etc., of the turf-care vehicle 10 that are structured and operable to control operation of the reel head assemblies and rotate the grass cutting reels during normal grass cutting/grooming procedures are further structured and operable to control operation of the reel head assemblies and rotate the verticut cylinders 14 during verticutting procedures. Hence, the grass cutting reel(s) can be removed and replaced by the verticut cylinder(s) 14 to transition the turf-care vehicle 10 from the grass cutting/grooming configuration to the verticutting configuration. Alternatively, to reconfigure the turf-care vehicle 10 from the grass cutting/grooming configuration to the verticutting configuration, each reel head assemblies 30 having the respective cylindrical grass cutting reel (not shown) rotationally mounted therein can be removed and replaced with an entirely different reel head assembly 30 having a respective verticut cylinder 14 rotationally mounted therein.

Referring now to FIGS. 3, 4, 5A, 5B, 5C, 6A and 6B, each verticut disk 18 comprises a center plate 34 that is fixedly mountable to the shaft 22 such that rotation of the shaft along a rotational axis A of the shaft 22 will also rotate each verticut disk 18 mounted to the shaft 22 about the rotational axis A. Additionally, the center plate 34 defines a center plane CP of the respective verticut disk 18 in which the center plate 34 will rotate upon rotation of the shaft 22. As will be easily and readily understood by one skilled in the art, rotation of the shaft 22, and hence the verticut cylinder 14 and corresponding verticut disks 18, is controlled by various motors, engines, drive systems, actuators, controllers, etc., of the turf-care vehicle 10. Accordingly, the various motors, engines, drive systems, actuators, controllers, etc., that provide and control rotation of the verticut cylinder and disks 14 and 18 about the shaft axis A will not be described herein.

Each verticut disk 18 additionally includes a plurality of teeth 38 extending from a circumferential edge 42 of the center plate 34. Each tooth 38 is structured and operable to cut and lift thatch, stolon and rhizome (i.e., horizontal roots connecting blades of grass, referred to herein as horizontal runners), promote an upright growth habit of the grass, and open grooves in the turf canopy to prepare for topdressing. Additionally, each verticut disk 18 (more particularly, each verticut cylinder 14) is structured and operable to cut and lift the thatch and horizontal runners, promote an upright growth habit of the grass, and open grooves in the turf canopy in a single pass, that is, without the need to verticut the same surface multiple times changing the cutting path direction each time. As used herein, the phrase 'cut and lift' will be understood to mean that each verticut disk 18 (and therefore each verticut cylinder 14) is structured and operable to cut the thatch and horizontal runners and lift the severed sections of thatch and horizontal runners above the top surface of the grass, whereafter the severed sections can be blown off, swept off, or otherwise removed from the top surface of the grass. Hence, a substantial portion, if not all, of the thatch and horizontal runners are removed from the undergrowth of the respective cutting surface via the verticut disks/cylinders 18/14.

Each tooth 38 includes a base 46 that extends from the circumferential edge 42 of the center plate 34 and at least one blade 50 that extends from the base 46 at an offset angle α (best shown in FIGS. 5B and 6B). Particularly, each blade 50 comprises a neck 54 that extends from the base 46 at the offset angle α and a tip 58 that extends radially outward from the neck 54 with respect to the center plate 34. That is, each tip 58 extends radially outward in a direction substantially parallel to the outward direction of radii of the center plate 34. The offset angle α orients the tip 58 of each tooth blade 50 such that it is offset from the center plane CP of the respective disk 18. The offset angle α can be any desired angle. For example, in various embodiments the offset angle α can be approximately 15°, or 30° (shown in FIGS. 5A and 5B), or approximately 90° (shown in FIGS. 6A and 6B), or any other desired angle. Although the offset angle α is exemplarily shown as being formed between the base 46 and blade 50, more particularly between the base 50 and a neck 54 of the blade (described below), it is envisioned that, in various embodiments, the offset angle α can be formed between the center plate 34 and the tooth base 46.

Figure 4:
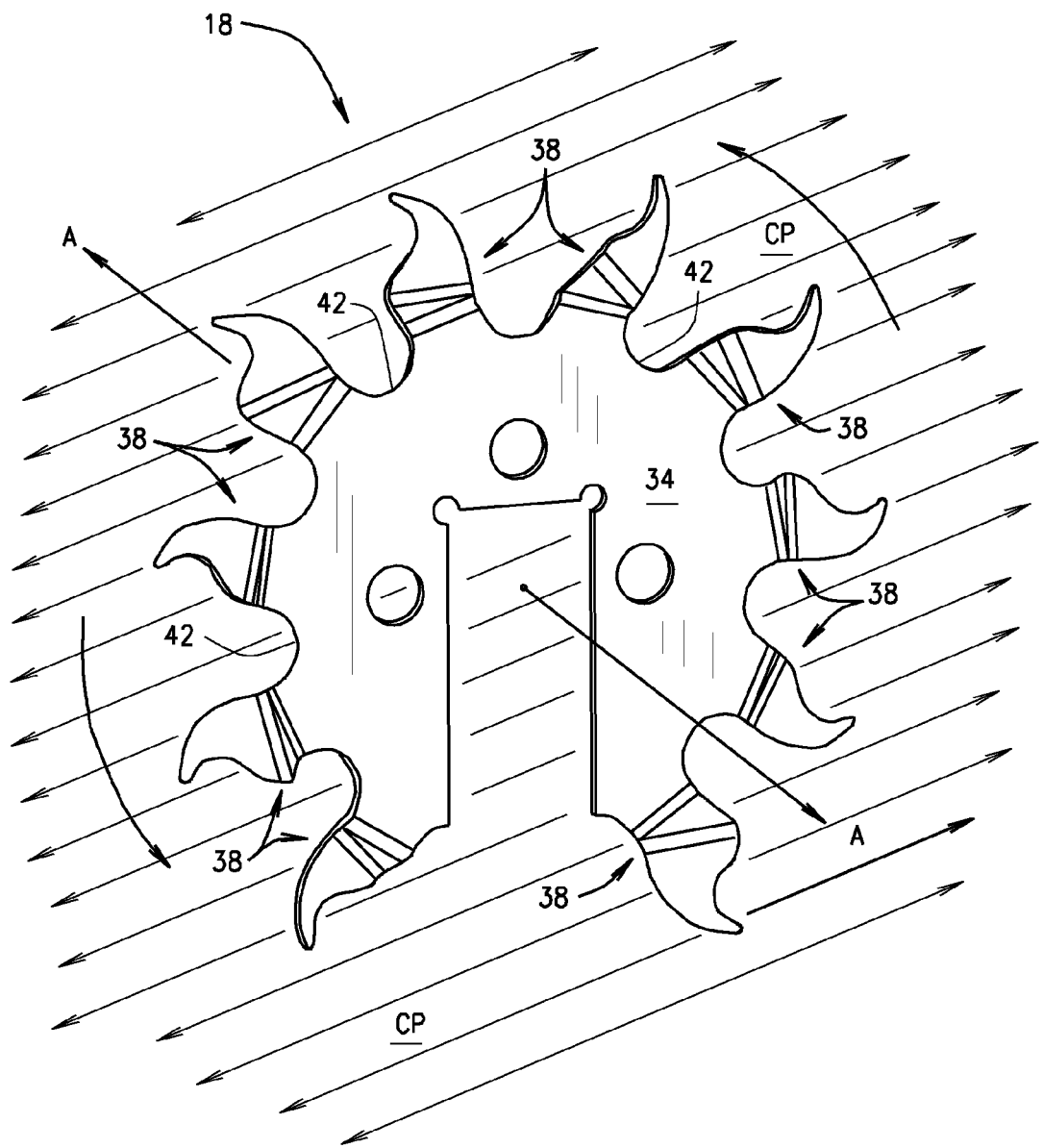
FIG. 4 is an isometric view of an exemplary vertical cutting disk included in the vertical cutting cylinder shown in FIG. 3, in accordance with various embodiments of the present disclosure.

In various embodiments, as exemplarily illustrated in FIGS. 3, 4 and 6B, the tips 58 of selected blades 50 of a respective disk 18 extend from the center plate at the offset angle α in first direction, and selected other blades tips 58 extend from the center plate 34 at the offset angle in second direction opposite the first direction. That is, selected tips 58 of each disk 18 are offset to one side of the respective center plane CP, while other tips 58 are offset to the opposing side of the respective center plane CP. For example, in various embodiments, each tooth tip 58 is offset to the opposite side of the center plane CP as the immediately adjacent teeth tips 58. Alternatively, a group of adjacent teeth tips 58, e.g., two, three, or four adjacent teeth tips 58, can be offset to one side of the center plane CP and a subsequent group of adjacent teeth tips 58 can be offset to the opposing side of the center plane CP.

Furthermore, each tip 58 extends radially outward from the neck 54 at a yaw angle β (best shown in FIGS. 5A, 5C and 6B) such that each tip 58 is angled, or 'twisted', with respect to center plane CP. More specifically, each tip 58 has a leading edge 58L and an opposing trailing edge 58F. As used herein, the leading edge 58L will be understood to be the edge of each respective blade tip 58 that will first contact the surface to be verticut as the verticut disks 18 are rotated via rotation of the shaft 22. The yaw angle β orients each tip 58 such that that each point along the respective leading edge 58L is a first, or leading edge, distance DLE from the center plane CP and each point along the respective trailing edge 58 is a second, or trailing edge, distance DTE from the center plane CP. With the exception of where the leading and trailing edges 59L and 58T meet at an apex of the respective tip, the leading edge distance DLE for every point along the lead edge 58L is different from (i.e., greater than or less than) the trailing edge distance DTE for every point along the trailing edge 58T. Accordingly, when the verticut disks 18 are rotated about the shaft axis A, except for at the apex, each point along the leading edge 58L of each tooth tip 58 will rotate in a different rotational plane from each point along the trailing edge 58T.

Figure 5C:
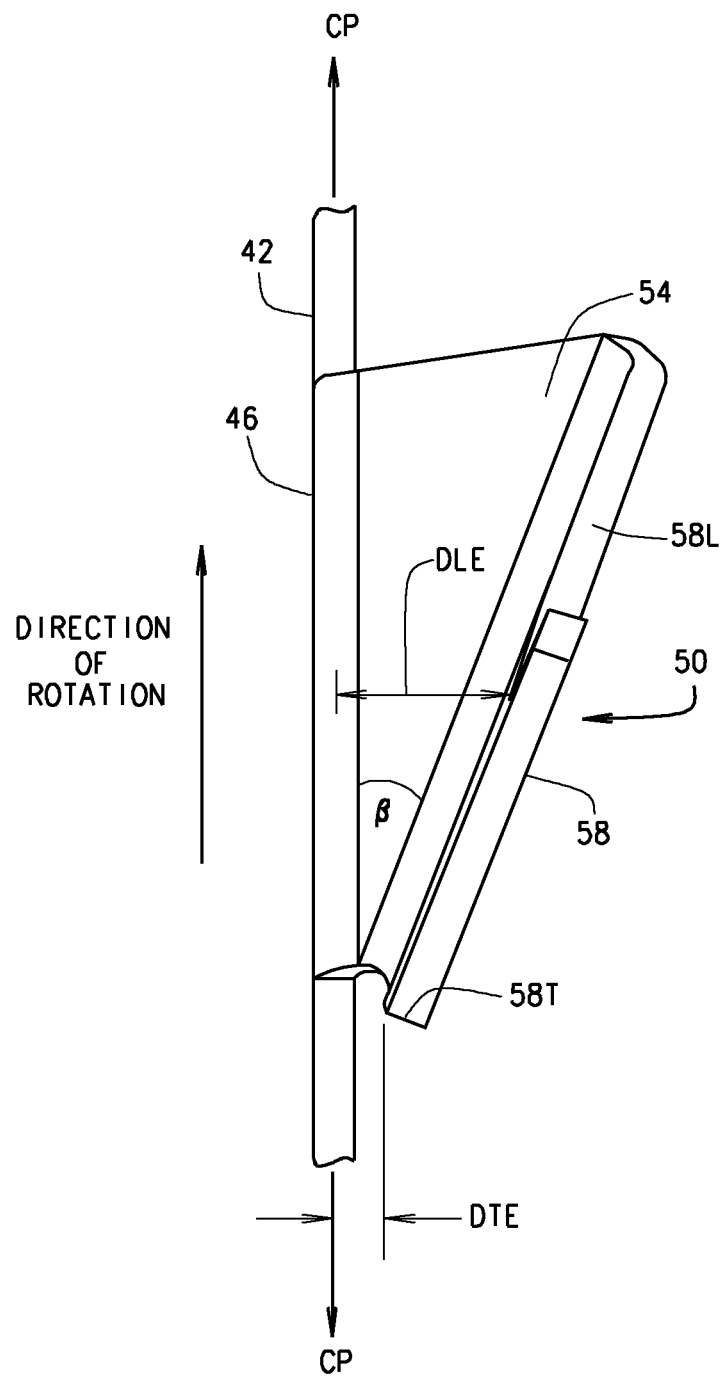
FIG. 5C is a top view of the tooth shown in FIG. 5A, in accordance with various embodiments of the present disclosure.
Figure 7:
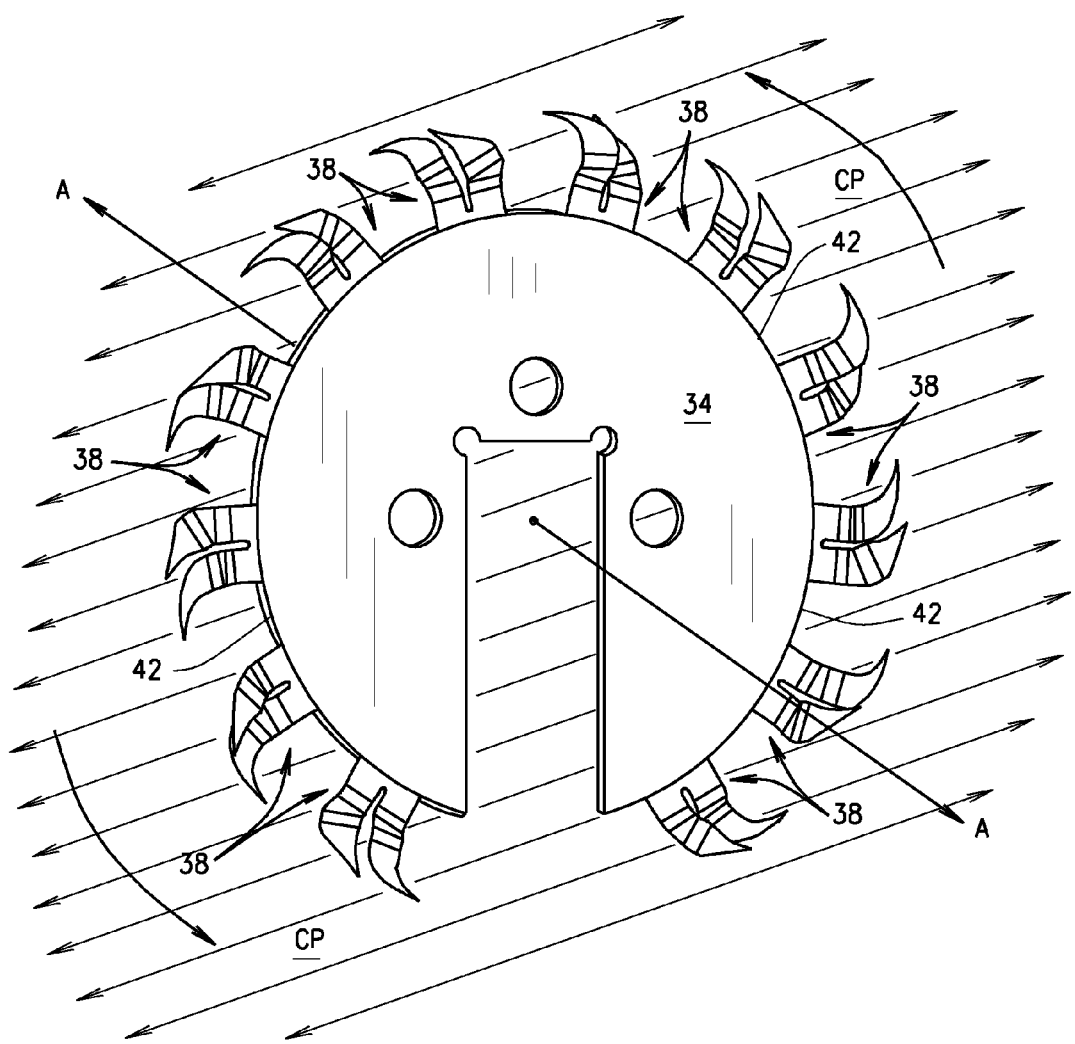
FIG. 7 is an isometric view of an exemplary vertical cutting disk included in the vertical cutting cylinder shown in FIG. 3, wherein the vertical cutting disk comprises double-bladed teeth, in accordance with various embodiments of the present disclosure.
Figure 8C:
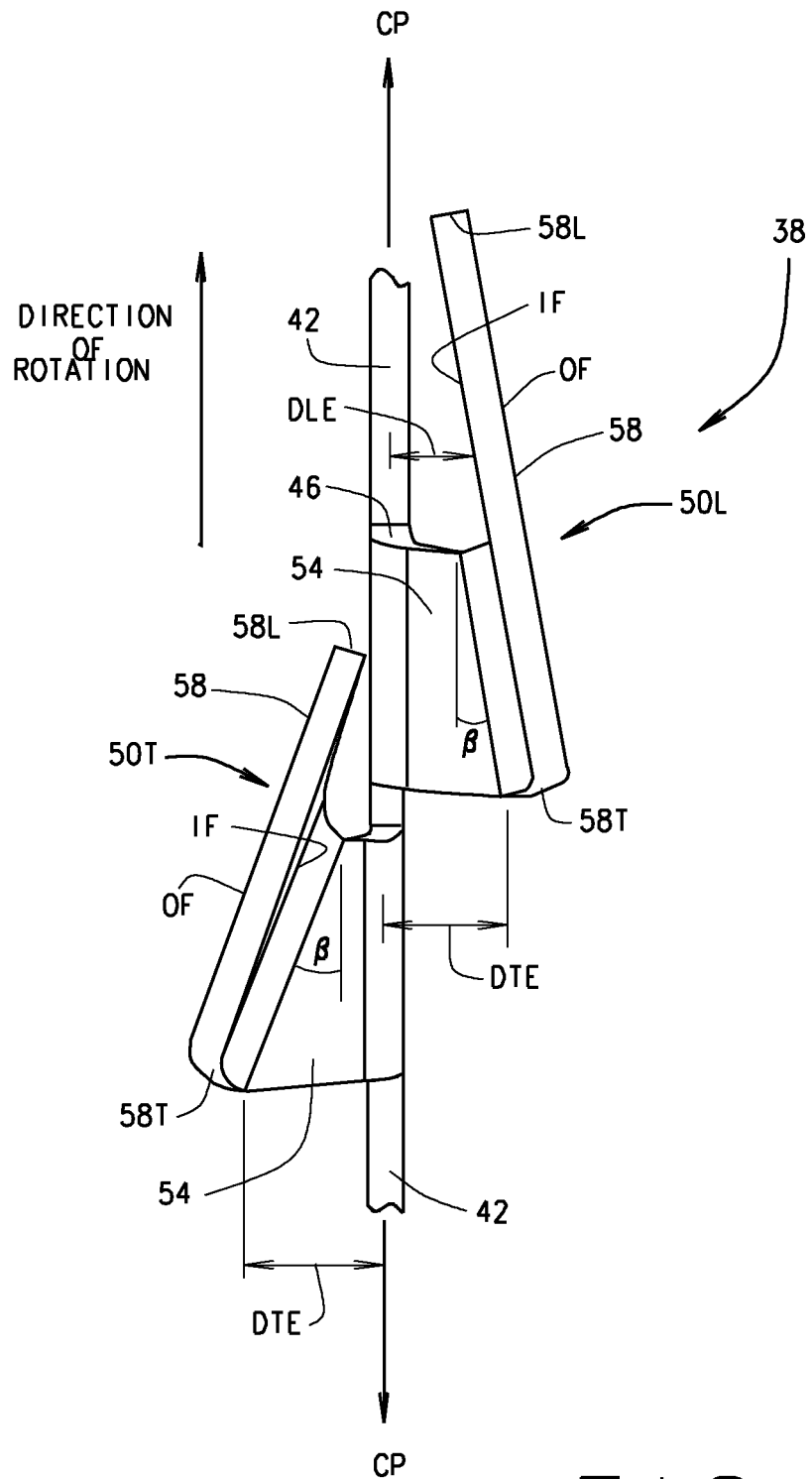
FIG. 8C is a top view of the double-bladed tooth shown in FIG. 8A, in accordance with various embodiments of the present disclosure.

Although it will be readily understood that the leading and trailing edge distances DTL and DTE will vary for each point along the respective leading and trailing edges 58L and 58T, for simplicity and clarity of the figures, the leading and trailing edge distances DLE and DTE are exemplarily illustrated in FIGS. 5B, 5C and 6B only at an approximate center point of the respective leading and trailing edges 58L and 58T.

The yaw angle β can be any desired angle. For example, in various embodiments the yaw angle β can be approximately 15°, or 30° (shown in FIGS. 5A, 5B and 5C), or 45° (shown in FIGS. 6A and 6B), or any other desired angle. Particularly, the yaw angle β angles, or twists, each respective tooth blade tip 58 such that, depending on the orientation of the yaw angle β, either an inner face IF or an outer face OF of each tip 58 will be rotationally forward facing as the as the respective disk 18 rotates. Accordingly, based on the respective yaw angle β, the forward facing inner or outer face IF or OF of each tip 58 will make a certain degree of frontal contact, e.g., 15°, 30°, 45°, etc., (as opposed to shear contact, i.e. 180°) with the surface into which the tip 58 is verticutting. Therefore, in addition to a cutting operation of each tip 58 that will cut the thatch and vertical runners, each tip 58 will also provide a scooping or lifting operation that will scoop or lift the severed sections of thatch and vertical runners from below the top surface of the grass and deposit them on top of the grass, whereafter the severed sections can be blown off, swept off, or otherwise removed from the top surface of the grass.

In various embodiments, each verticut disk 18 can be fabricated such that the yaw angle β of each tooth blade 50 orients the respective tips 58 such the leading edge 58L of each tip 58 is closer to the center plane CP than the trailing edge 58T of each respective tip 58, whereby the outer face OF of each tip 58 will make the degree of frontal contact with the surface being verticut. Alternatively, in other embodiments, each verticut disk 18 can be fabricated such that the yaw angle β of each tooth blade 50 orients the respective tips 58 such that the trailing edge 58T of each tip 58 is closer to the center plane CP than the leading edge 58L of each respective tip 58, whereby the inner face IF of each tip 58 will make the degree of frontal contact with the surface being verticut. In still yet other embodiments, each verticut disk 18 can be fabricated such that the yaw angle β of selected teeth blades 50 can orient the respective tips 58 such the leading edge 58L of each tip 58 is closer to the center plane CP than the trailing edge 58T of each respective tip 58, while the yaw angle β of selected other teeth blades 50 orients the respective tips 58 such the trailing edge 58T of each tip 58 is closer to the center plane CP than the leading edge 58L of each respective tip 58. Accordingly, in such embodiments, the outer face OF of selected tips 58 will make the degree of frontal contact with the surface being verticut, while the inner face IF of selected other tips 58 will make the degree of frontal contact with the surface being verticut.

Furthermore, in various embodiments, the profile, or contour, of the leading edge 58L of each tip 58 of a respective disk 18 can be substantially the same. Or, in various other embodiments, the tip leading edges 58L of the respective disk 18 can have different profiles/contours. Similarly, in various embodiments, the profile, or contour, of the trailing edge 58T of each tip 58 of a respective disk 18 can be substantially the same. Or, in various other embodiments, the tip trailing edges 58T of the respective disk 18 can have different profiles/contours. It is envisioned that, different leading edge profiles/contours can provide different cutting and/or scooping/lifting benefits. For example, in various embodiments, as exemplarily illustrated in FIGS. 4, 5A, 5B, 6A and the right half of 6B, the leading edge 58L of one or more tips 58 of a disk 18 can have a concave profile/contour such that the respective tip(s) 58 has/have a hooked shape that is structured and operable to lift and cut thatch and horizontal runners, and thereafter scoop/lift the severed sections to the top of the grass surface. Alternatively, in various embodiments, as exemplarily illustrated in the left half of FIG. 6B, the leading edge 58L of one or more tips 58 of a disk 18 can have a substantially straight or only slightly concave profile/contour such that the respective tip(s) 58 has/have a triangular shape that is structured and operable to cut thatch and horizontal runners.

It is envisioned that, in various other embodiments, the leading edge 58L and/or the trailing edge 58T of one or more tips 58 of a respective disk 18 can have any other desired profile/contour, for example, convex, S-shaped, Z-shaped, etc., in order to provide other desired verticutting functionality.

Referring now to FIGS. 7, 8A, 8B and 8C, as described above, each tooth 38 includes the base 46 and at least one blade 50 that extends from the base 46 at the offset angle α. For example, FIGS. 5, 5A, 5B, 5C, 6A and 6B, as described above, illustrate the verticut disk 18 having a plurality of single-bladed teeth 38, in accordance with various embodiments. FIGS. 7, 8A, 8B and 8C, as described below, illustrate the verticut disk 18 having a plurality of double-bladed teeth 38, in accordance with various embodiments. Although not illustrated or described herein, it is envisioned that the verticut disk 18 can comprise teeth 38 having three, four or more blades and remain within the scope of the present disclosure.

In various double-bladed tooth embodiments, as exemplarily illustrated in FIGS. 7, 8A, 8B and 8C, each tooth 38 comprises a pair of blades 50, referred to and illustrated herein as leading blade 50L and trailing blade 50T. Each of the leading blade 50L and the trailing blade 50T are identical in the various features and functions as the various embodiments of the blade 50 of the single-blade tooth described above with reference to FIGS. 3 through 5C. Therefore, many of the features and functions of the individual leading blade 50L and the individual trailing blade 50T will not be re-described here, noting that like reference numerals will be used to refer to like elements throughout FIGS. 1 through 8C.

As shown in FIGS. 7, 8A, 8B and 8C, in such double-bladed tooth embodiments, the neck 51 of the leading blade 50L includes the offset angle α such that the tip 58 of the leading blade 50L is offset to one side of the center plane CP, and the neck 51 of the trailing blade 50T includes the offset angle α such that the tip 58 of the trailing blade 50L is offset to the opposing side of the center plane CP. In various embodiments, the offset angle α of the leading blade 50L of each tooth 38 of the disk 18 is substantially the same as the offset angle α of the respective trailing blade 50T. In various other embodiments, the offset angle α of the leading blade 50L of each tooth 38 of the disk 18 is different from the offset angle α of the respective trailing blade 50T. In yet other embodiments, the offset angle α the leading blade 50L of one or more teeth 38 of the disk 18 is substantially the same as the offset angle α of the respective trailing blade 50T, while the offset angle α the leading blade 50L of one or more other teeth 38 of the disk 18 is different from the offset angle α of the respective trailing blade 50T.

Moreover, the tip 58 of the leading blade 50L and the trailing blade 50T each extend radially outward from the respective neck 54 at the yaw angle β such that each respective tip 58 is angled, or 'twisted', with respect to center plane CP, as described above with reference to FIGS. 3 through 6B. In various embodiments the yaw angle β for the tip 58 of the leading blade 50L of each tooth 38 of the disk 18 can be substantially the same as the yaw angle β for the tip 58 of the respective trailing blade 50T. Alternatively, in various embodiments, the yaw angle β for the tip 58 of the leading blade 50L of each tooth 38 of the disk 18 can be different from the yaw angle β for the tip 58 of the respective trailing blade 50T. In still other embodiments, the yaw angle β for the tip 58 of the leading blade 50L of one or more teeth 38 of the disk 18 can be substantially the same as the yaw angle β for the tip 58 of the respective trailing blade 50T, and the yaw angle β for the tip 58 of the leading blade 50L of one or more other teeth 38 of the disk 18 can be different from the yaw angle β for the tip 58 of the respective trailing blade 50T.

Additionally, in various embodiments, the profile, or contour, of the leading edge 58L of the tip 58 of the leading blade 50L of each tooth 38 of the disk 18 can have substantially the same profile, or contour, as the leading edge 58L of the tip 58 of the respective trailing blade 50T. Or, in various other embodiments, as exemplarily shown in FIGS. 7, 8A, 8B and 8C, the leading edge 58L of the tip 58 of the leading blade 50L of each tooth 58 of the disk 18 can have a different profile, or contour, from the leading edge 58L of the tip 58 of the respective trailing blade 50T. For example, in various embodiments, the leading edge 58L of the leading blade tip 58 for one or more teeth 38 of the disk 18 can have a concave profile/contour such that the tip(s) 58 has/have a hooked shape that is structured and operable to lift and cut thatch and horizontal runners, and thereafter scoop/lift the severed sections to the top of the grass surface. Additionally, in such embodiments, the leading edge 58L of trailing blade tip 58 for the one or more teeth 38 can have a substantially straight or only slightly concave profile/contour such that the respective tip(s) 58 has/have a triangular shape that is structured and operable to cut thatch and horizontal runners.

Furthermore, in yet other various embodiments, the leading edges 58L of the tips 58 of each of the leading and trailing blades 50L and 50T of one or more teeth 38 of the verticut disk 18 can have the same profile, or contour, while one or more other teeth 38 of the respective disk 18 can have leading and trailing blade tips 58 with leading edges 58L having different profiles, or contours.

Similarly, in various embodiments, the profile, or contour, of the trailing edge 58T of the tip 58 of the leading blade 50L of each tooth 38 of the disk 18 can have substantially the same profile, or contour, as the trailing edge 58T of the tip 58 of the respective trailing blade 50T. Or, the trailing edge 58T of the tip 58 of the leading blade 50L of each tooth 58 of the disk 18 can a different profile, or contour, than the trailing edge 58T of the tip 58 of the respective trailing blade 50T. Or, the trailing edges 58T of the tips 58 of each of the leading and trailing blades 50L and 50T of one or more teeth 38 of the disk 18 can have the same profile, or contour, while one or more other teeth 38 of the respective disk 18 can have leading and trailing blade tips 58 with trailing edges 58T having different profiles, or contours.

Further yet, in various embodiments, the yaw angle β of the leading blade tip 58 and the yaw angle of the trailing blade tip 58 of each tooth 38 of the disk 18 orient the respective tips 58 such that both tips 58 have their outer faces OF rotationally forward facing. In various other embodiments, the yaw angle β of the leading blade tip 58 and the yaw angle of the trailing blade tip 58 of each tooth 38 of the disk 18 orient the respective tips 58 such that both tips 58 have their inner faces IF rotationally forward facing. In yet other embodiments, the yaw angle β of the leading blade tip 58 and the yaw angle of the trailing blade tip 58 of each tooth 38 of the disk 18 orient the respective tips 58 such that one of the tips 58 has its outer face OF rotationally forward facing and the other tip has its inner face IF rotationally forward facing. In yet other embodiments, the yaw angle β of the leading blade tip 58 and the yaw angle of the trailing blade tip 58 of one or more teeth 38 of the disk 18 orient the respective tips 58 such that both tips 58 have either their outer faces OF or their inner faces IF rotationally forward facing, while the yaw angle β of the leading blade tip 58 and the yaw angle of the trailing blade tip 58 of one or more other teeth 38 orient the respective tips 58 such that one of the tips 58 has its outer face OF rotationally forward facing and the other tip has its inner face IF rotationally forward facing.

Figure 9:
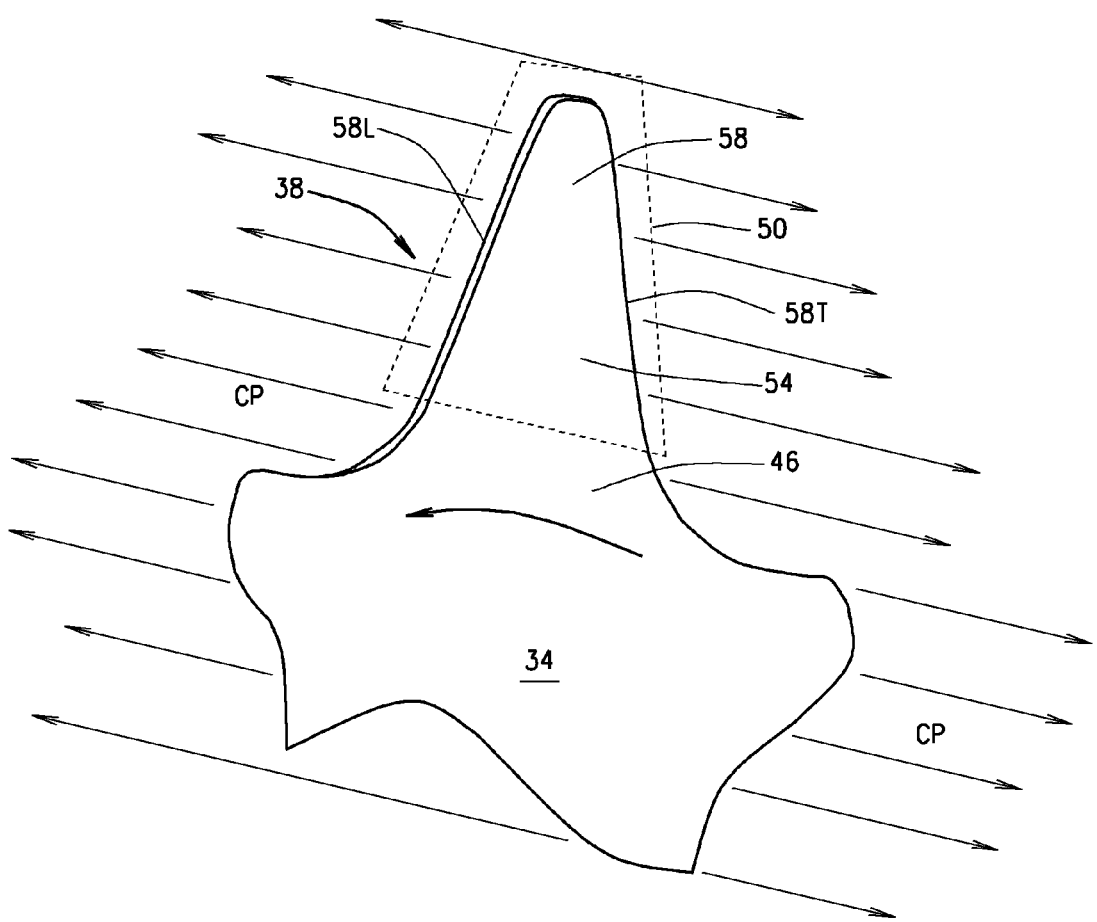
FIG. 9 is an isometric view of an exemplary flat tooth of a vertical cutting disk such as that shown in FIG. 4, in accordance with various other embodiments of the present disclosure.
Figure 9A:
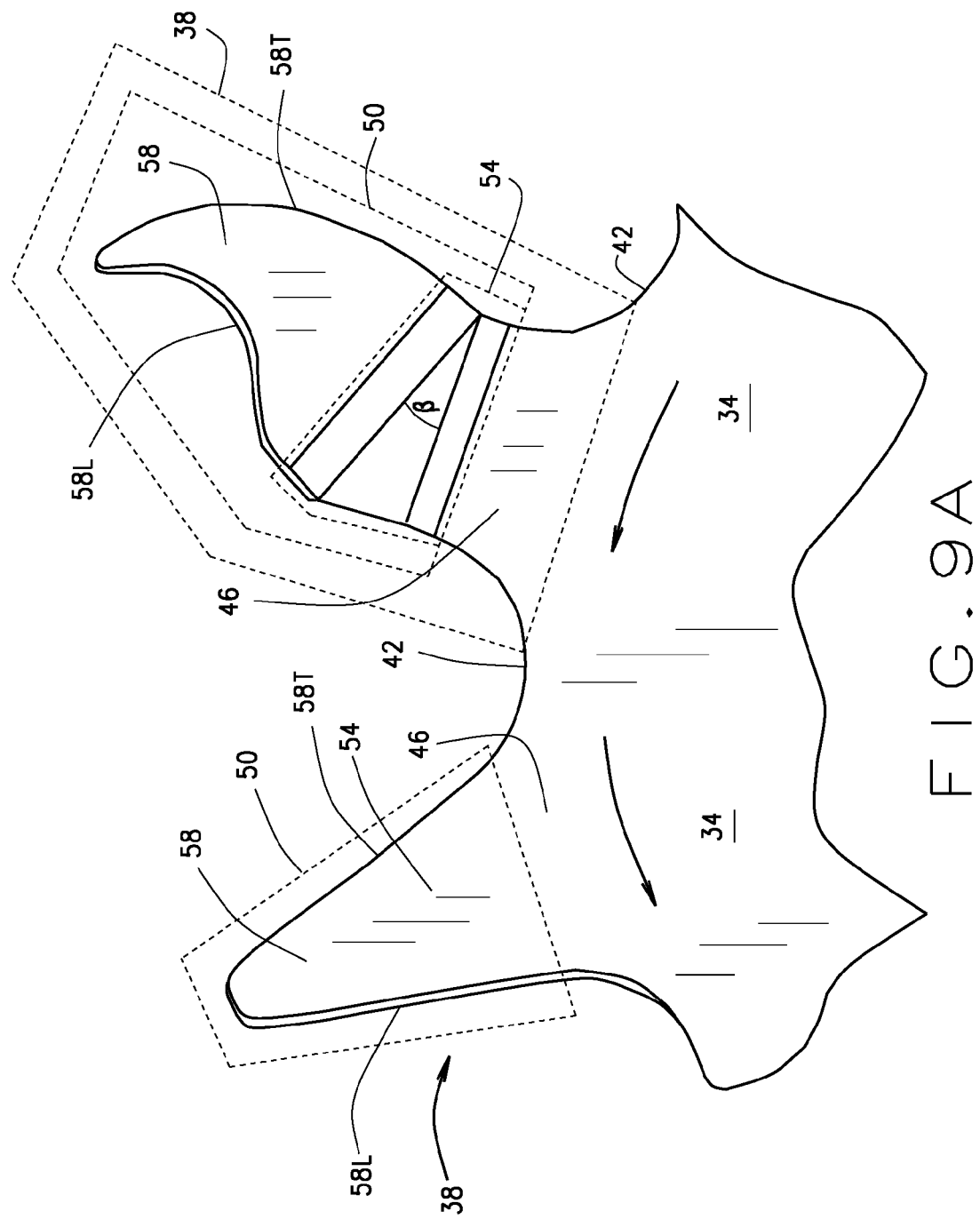
FIG. 9A is an isometric view of a portion of a vertical cutting disk such as that shown in FIG. 4 comprising at least one flat tooth, and at least one tooth having an offset tip that extends radially outward from a neck of the tooth at a yaw, in accordance with various other embodiments of the present disclosure.

Referring now to FIGS. 9 and 9A, in various embodiments, at least one of the teeth 38 of the disk 18 can be substantially flat such that the entirety of each such tooth 38 is coplanar with center plate 34 of the disk 18. More specifically, the base 46 and the blade 50 (i.e., the blade neck 54 and the blade tip 58) lie entirely within the center plane CP.

It is envisioned that the verticut cylinders 14 and verticut disks 18, as described above, are more effective at severing and lifting/scooping up thatch material and horizontal runners and depositing them on top of the grass surface than known verticutting cylinders and disks, which merely cut through the thatch sever the horizontal runners and leave the severed debris beneath the grass top surface. As a result of more effectively lifting the severed horizontal runners and depositing them on top of the grass surface, the verticut cylinders 14 and verticut disks 18 are more effective at promoting vertical growth than known verticutting cylinders and disks. Furthermore, the offset angles α and yaw angles β of reach tooth blade 50/50L/50T configure the respective blades 50/50L/50T such that the horizontal runners are attacked from different angles by different edges and face of each blade tip 58, i.e., the leading edge 58L and inner face IF and/or the outer face OF. Therefore, regardless of the direction and orientation of the horizontal runners, the verticut cylinders 14 and verticut disks 18 ensures that the horizontal runners are cut, lifted and deposited on the top of the grass surface regardless of the path in which the operator drives the vehicle 10.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A vertical cutting disk for vertically cutting grass surfaces, said disk comprising:
   a flat center plate mountable to a shaft, the center plate defining a center plane of the disk;
   a plurality of teeth extending from a circumferential edge of the center plate, each tooth comprising:
      a base that extends from the circumferential edge of the center plate and lies in the center plane of the disk; and
      at least one blade extending from the base at an offset angle, each blade comprising:
         a neck extending from the base at the offset angle; and
         a tip, wherein the entire tip extends radially outward from the neck relative to the center plane substantially parallel to an outward direction of radii of the center plate such that the entire tip is offset from the center plane, the tip also extending from the neck at a yaw angle relative to the center plane such that when the disk is rotated about a rotational axis of the shaft a leading edge of the tip will rotate in a different rotational plane than a trailing edge of the tip.

2. The disk of claim 1, wherein selected ones of the blades extend from the center plate at the offset angle in a first direction relative to the center plane, and other selected ones of the blades extend from the center plate at the offset angle in a second direction opposite the first direction.

3. The disk of claim 1, wherein the yaw angle of each of at least one of the tips positions the leading edge of the each of at least one of the tips closer to the center plane than the trailing edge of each tip.

4. The disk of claim 1, wherein the yaw angle of each of at least one of the tips positions the trailing edge of the each of at least one of the tips closer to the center plane than the leading edge of each tip.

5. The disk of claim 1, wherein at least one of the tips has a different profile from other ones of the tips.

6. The disk of claim 1, wherein the at least one blade of at least one of the teeth comprises a plurality of blades extending from the base.

7. The disk of claim 6, wherein the plurality of blades comprises a leading blade and a trailing blade.

8. The disk of claim 7, wherein a leading edge of the leading blades has a different curvature than a leading edge of the trailing blades such that a profile of the leading blades is different from a profile of the trailing blades.

9. The disk of claim 8, wherein the necks of the leading blade of each tooth extend from the base at the offset angle in a first direction relative to the center plane, and the necks of the trailing blade of each tooth extends from the base at the offset angle in a second direction opposite the first direction.

10. The disk of claim 1 further comprising at least one flat tooth extending from a circumferential edge of the center plate, wherein the entire at least one flat tooth is coplanar with the center plate and lies entirely within the center plane.

11. A vertical cutting cylinder rotationally mountable within a reel head assembly of turf-care vehicle for vertically cutting grass surfaces, said vertical cutting cylinder comprising:
   a shaft structured and operable to rotationally mount the vertical cutting cylinder within the reel head assembly; and
   a plurality of vertical cutting disks mounted to and spaced apart along the shaft, each vertical cutting disk comprising:
      a flat center plate mountable to the shaft, the center plate defining a center plane of the disk;
      a plurality of teeth extending from a circumferential edge of the center plate, each tooth comprising:
         a base that extends from the circumferential edge of the center plate and lies in the center plane of the disk; and
         at least one blade extending from the base at an offset angle, each blade comprising:
            a neck extending from the base at the offset angle; and
            a tip, wherein the entire tip extends radially outward from the neck relative to the center plane substantially parallel to an outward direction of radii of the center plate such that the entire tip is offset from the center plane, the tip also extending from the neck at a yaw angle relative to the center plane such that when the disk is rotated about a rotational axis of the shaft a leading edge of the tip will rotate in a different rotational plane than a trailing edge of the tip.

12. The disk of claim 11, wherein selected ones of the blades extend from the center plate at the offset angle in a first direction relative to the center plane, and other selected ones of the blades extend from the center plate at the offset angle in a second direction opposite the first direction.

13. The disk of claim 11, wherein the yaw angle of each tip positions the leading edge of each tip closer to the center plane than the trailing edge of each tip.

14. The disk of claim 11, wherein the yaw angle of each tip positions the trailing edge of each tip closer to the center plane than the leading edge of each tip.

15. The disk of claim 11, wherein at least one of the tips has a different profile than other ones of the tips.

16. The disk of claim 11 wherein the at least one blade of at least one of the teeth comprises a leading blade extending from the base and a trailing blade extending from the base.

17. The disk of claim 16, wherein a leading edge of the leading blades has a different curvature from a leading edge of the trailing blades such that a profile of the leading blades is different from a profile of the trailing blades.

18. The disk of claim 17, wherein the neck of the leading blade of each tooth extends from the base at the offset angle in a first direction relative to the center plane, and the neck of the trailing blade of each tooth extends from the base at the offset angle in a second direction opposite to the first direction.

19. A turf-care vehicle for vertically cutting grass surfaces, said vehicle comprising:
   at least one reel head assembly; and
   a vertical cutting cylinder rotationally mountable within each reel head assembly, each vertical cutting cylinder comprising:
      a shaft structured and operable to rotationally mount the vertical cutting cylinder within the respective reel head assembly; and
      a plurality of vertical cutting disks mounted to and spaced apart along the shaft, each vertical cutting disk comprising:
         a flat center plate mountable to the shaft, the center plate defining a center plane of the disk;
         a plurality of teeth extending from a circumferential edge of the center plate, each tooth comprising:
            a base that extends from the circumferential edge of the center plate and lies in the center plane of the disk; and
            at least one blade extending from the base at an offset angle, each blade comprising:
   a neck extending from the base at the offset angle; and
   a tip, wherein the entire tip extends radially outward from the neck relative to the center plane substantially parallel to an outward direction of radii of the center plate such that the entire tip is offset from the center plane, the tip also extending from the neck at a yaw angle relative to the center plane such that when the disk is rotated about a rotational axis of the shaft a leading edge of the tip will rotate in a different rotational plane from a trailing edge of the tip.

* * * * *